D. JULIAN.
STOCK HOLDING AND DELIVERING MECHANISM FOR BOLT POINTING MACHINES.
APPLICATION FILED JAN. 30, 1914.

1,108,448.

Patented Aug. 25, 1914.
4 SHEETS—SHEET 1.

Witnesses:
Josephine M. Strempfer
Adolph C. Kaiser

Inventor:
David Julian
by Harry R. Williams
Atty

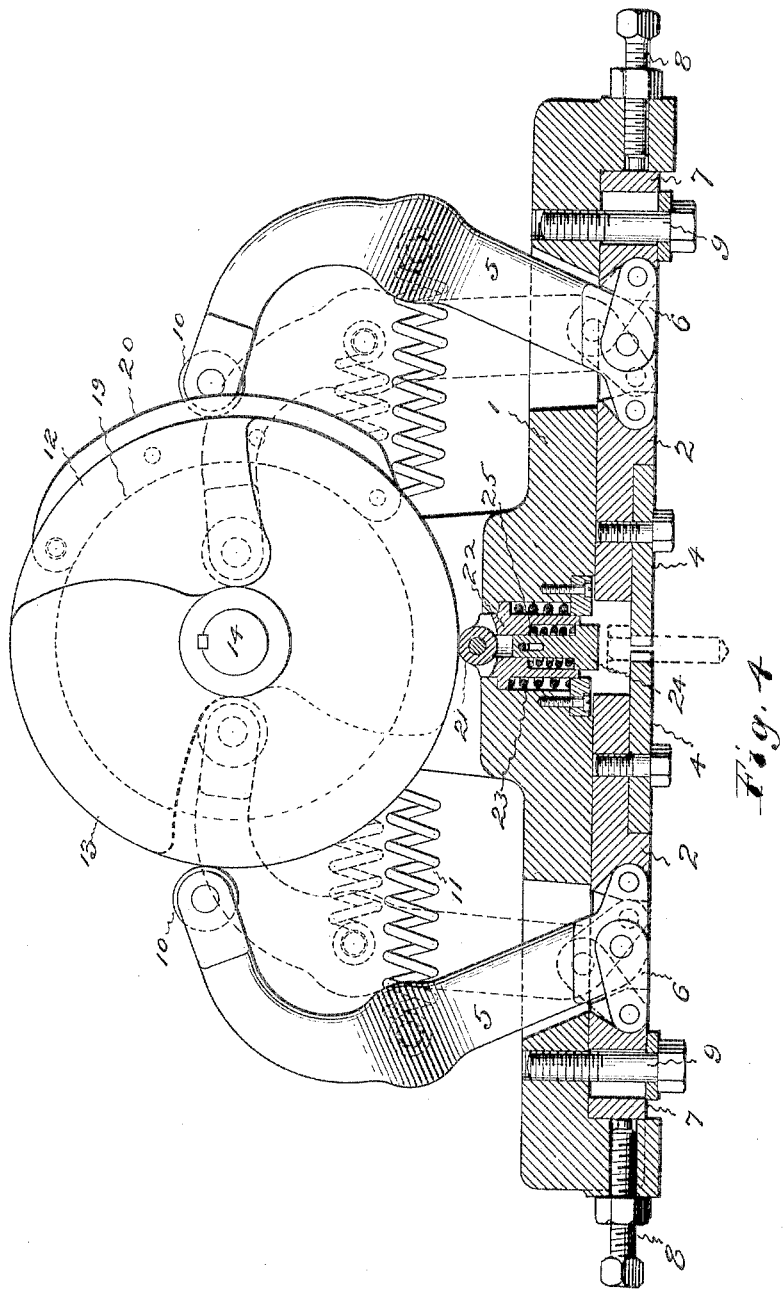

UNITED STATES PATENT OFFICE.

DAVID JULIAN, OF WATERBURY, CONNECTICUT, ASSIGNOR TO THE E. J. MANVILLE MACHINE COMPANY, OF WATERBURY, CONNECTICUT, A CORPORATION OF CONNECTICUT.

STOCK HOLDING AND DELIVERING MECHANISM FOR BOLT-POINTING MACHINES.

1,108,448. Specification of Letters Patent. Patented Aug. 25, 1914.

Application filed January 30, 1914. Serial No. 815,371.

*To all whom it may concern:*

Be it known that I, DAVID JULIAN, a citizen of the United States, residing at Waterbury, in the county of New Haven and State of Connecticut, have invented a new and useful Improvement in Stock Holding and Delivering Mechanism for Bolt-Pointing Machines, of which the following is a specification.

It is common practice to round, bevel or point the ends of bolts and machine screws. Machines have been constructed which automatically take the bolts and screws from a promiscuous mass in a hopper and feed them to fingers which carry them one at a time to mechanism which holds them while the ends are being operated upon by the cutting tool.

This invention relates to the mechanism in a machine of this character which grips and holds the stock while the cutting tool is operating upon the end, and which picks the stock from the holder and throws it out of the machine.

The object of the invention is to provide a comparatively simple mechanism for such a machine which will operate to grip the pieces of stock very powerfully and hold them in correct position while the ends are being turned, and will quickly deliver the stock from the machine after the ends have been shaped, which mechanism can be readily adjusted to accommodate bolts, screws and rods of various sizes.

In the accompanying drawings only so much of the machine is shown as relates to the stock holding and delivering mechanisms.

Figure 1:
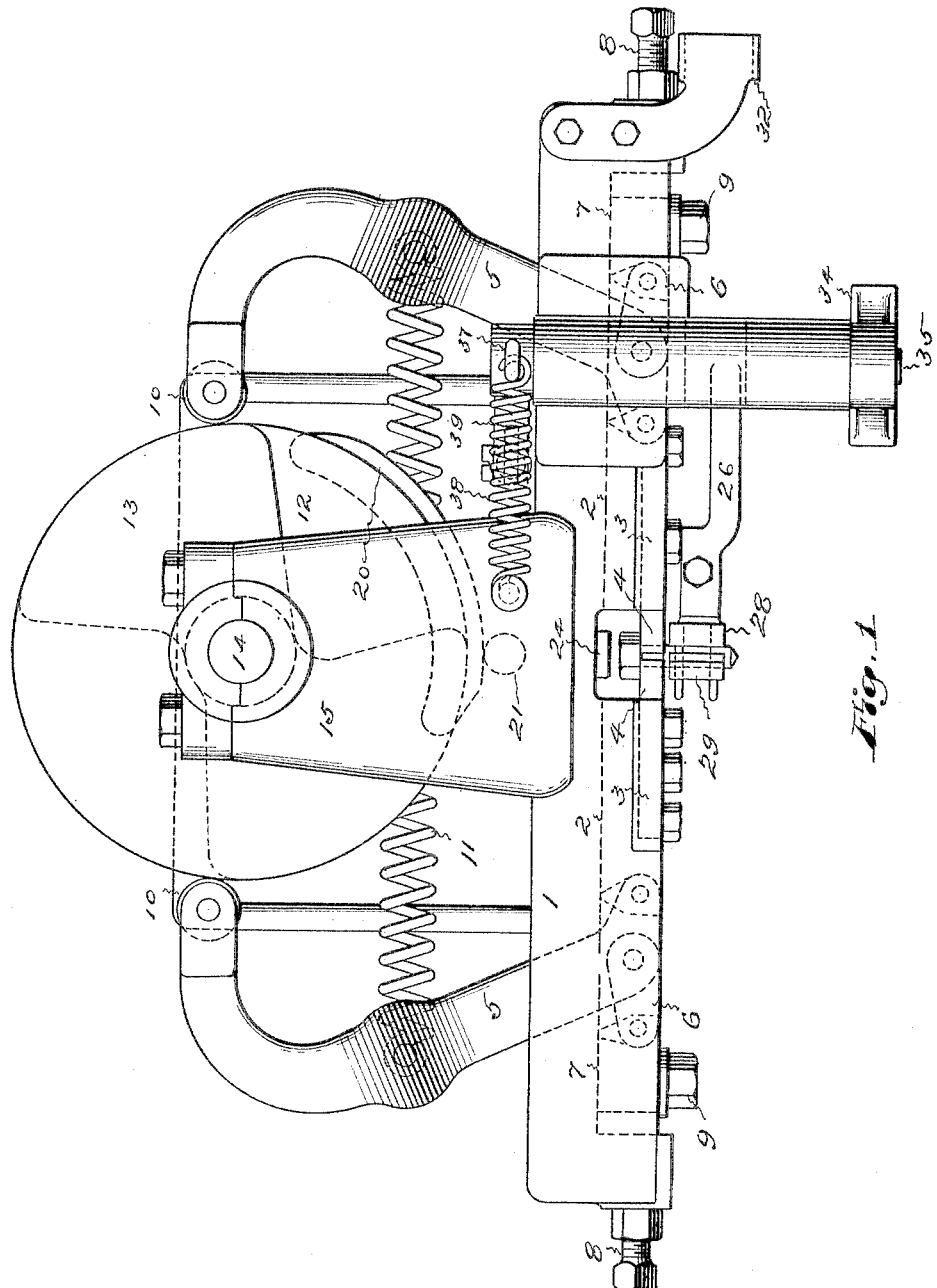
Figure 2:
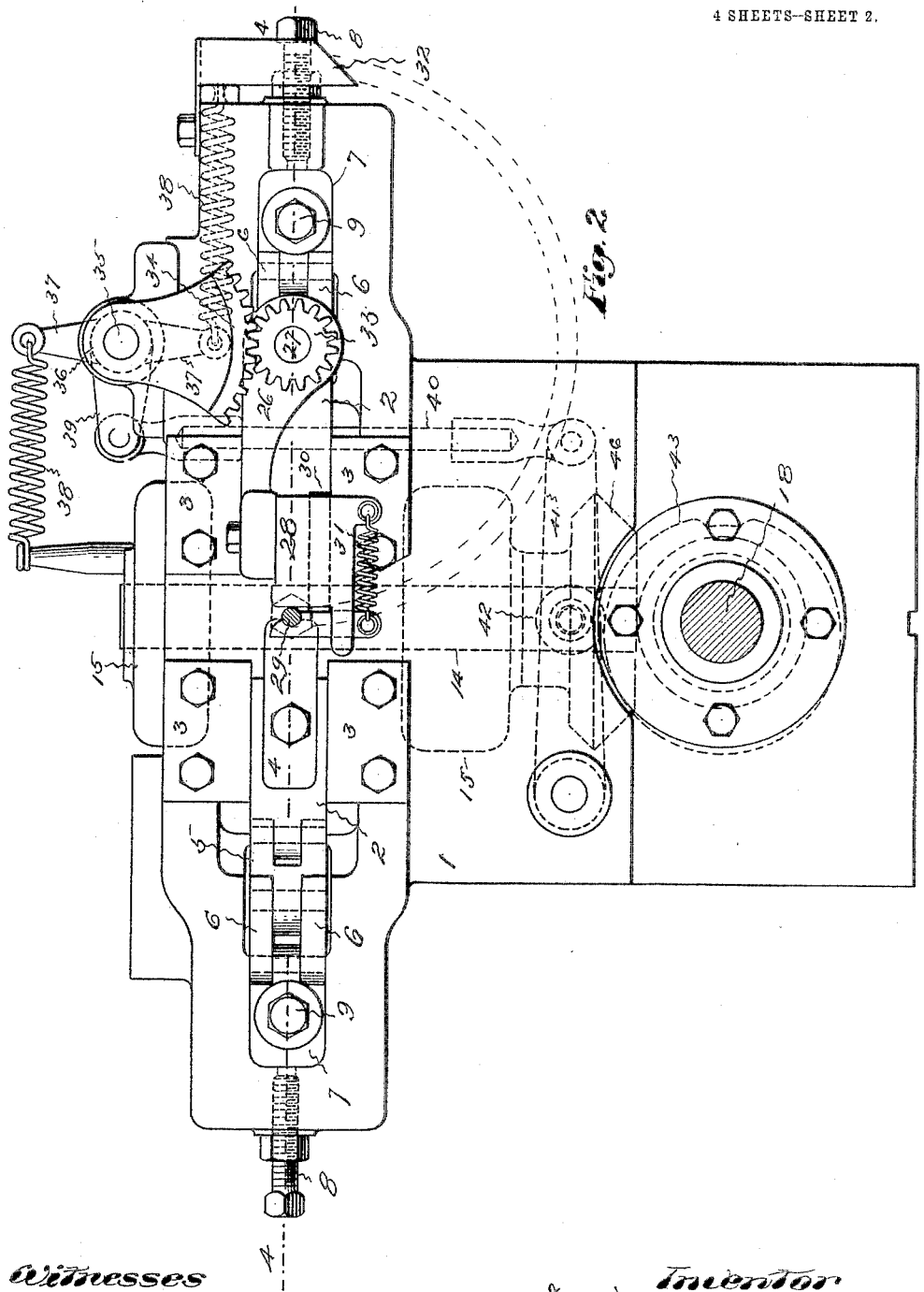
Figure 3:
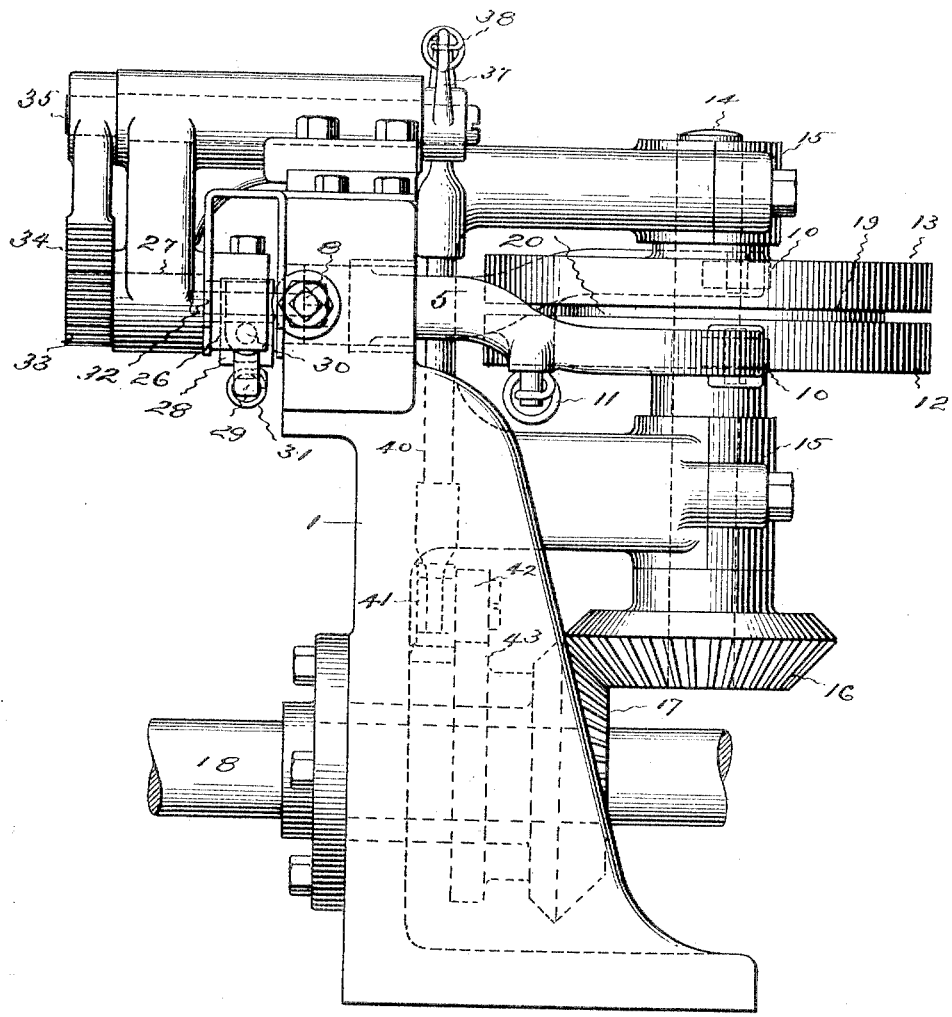

Figure 1 shows a plan of the holding and delivering mechanism. Fig. 2 shows a front elevation of the same. Fig. 3 shows a side elevation. Fig. 4 shows a horizontal section through the holding jaws on the plane indicated by the dotted line 4—4 on Fig. 2.

In the face of the head of the standard 1 is a horizontal guide-way in which are two sliding chuck blocks 2. These chuck blocks are held in position by gib plates 3. Bolted to the faces of these chuck blocks are hardened plates 4 which form the chuck jaws that are employed to grip the stock. The blocks 2 are jointed to the front ends of levers 5 which are pivotally connected by toggle links 6 with backing blocks 7 that are held in the guide-way in the front of the head of the standard. The blocks 7 are adjusted to the desired positions by the screws 8 and then are clamped by the bolts 9. The rear ends of the levers 5 are provided with rolls 10. These levers are offset and are pulled together by the spring 11 so that the roll on one lever is held against the cam disk 12 and the roll on the other lever is held against the cam disk 13. These cam disks are mounted one above the other on the vertical shaft 14 that is supported by bearings in brackets 15. The lower end of this shaft has a bevel gear 16 which meshes with a bevel gear 17 on the main driving shaft 18. When the cam disks 12 and 13 are rotated through these shafts and gears the cams force the rear ends of the levers apart against the tension of the spring and this causes the toggle links, to which the front ends of the levers are connected, to so move the levers that they force the chuck blocks toward each other. This movement is very powerful so that the jaws which the blocks carry will tightly grip and firmly hold any stock that is between them. These positions of the parts are shown in full lines in Fig. 4. When the low sections of the cams come opposite the levers as the cam disks rotate the rear ends of the levers are drawn in by the spring which connects them, and this causes the front ends of the levers to swing out on the toggle links and draw back the chuck blocks so that the jaws will open and release the stock that is between them. These positions of the levers and toggle links are shown in dotted outline in Fig. 4. When the bolts 9 are loosened, the backing blocks to which the toggle links are connected can be adjusted to the required positions, by means of the screws 8, to cause the levers to move the blocks so the chuck jaws will grasp the stock with the necessary firmness. By means of this arrangement the chuck may be readily adjusted for holding stock of various diameters.

On the shaft 14, between the cams 12 and 13 is a disk 19, which carries a cam block 20. This cam block as the shaft is rotated engages a roll 21 on the rear end of a block 22 which is movably located in a socket in the standard head and which is forced rearwardly by a spring 23. This block carries a plunger 24 that is normally forced forward by a spring 25. When the cam block 20 engages the roll 21 it forces the block and the plunger forward so that the plunger will engage the head of the bolt, screw or other piece of stock and force it forward between the chuck jaws to the exact position necessary for the proper action of the cutting tool on the other end of the stock. When the head of the stock is forced against the chuck jaws, the plunger yields so that none of the parts will be damaged, and when the cam block has passed the roll the block and the plunger are by the springs returned to normal position. (Fig. 4).

After the stock which is held by the chuck jaws has had its end turned to the desired shape, it is taken from the jaws and thrown out at one side of the machine. This is accomplished by means of a swinging arm 26 which is mounted on a shaft 27, and that has a head 28 with a yielding finger 29. The finger has a stem 30 that is mounted in an opening in the head 28. A spring 31 draws the finger back so that when the parts are swung upward the finger yields and snaps onto the piece of stock in the chuck jaws and the spring draws it back so as to hold the stock between the finger and the opposing face of the head. At the proper time, after the chuck jaws have released their grip on the bolt, the arm with the head carrying the stock is swung around until the stock encounters and is pushed out of the grasp of the finger by the ends of the yoke 32 that is attached to the outer end of the head of the standard.

On the front end of the shaft 27 is a pinion 33 that is engaged by the teeth of a segmental rack 34 which is attached to the front end of a shaft 35. On the rear end of the shaft 35 are two oppositely extending arms 37 that are connected with springs 38 arranged to hold the shaft and segmental rack in normal position. The shaft 35 has a rocker arm 39 which is connected by a link 40 with a lever 41 which carries a roll 42 that is in contact with the cam 43 on the driving shaft 18. By means of this cam, lever, link and arm, at the proper time, the segment and pinion are oscillated so that the delivering head and finger will come up and grasp the stock that is held by the chuck jaws, and after getting it will swing down and toward the side until the blank is pushed out of the grasp of the finger by contact with the yoke 32 that is fastened to the end of the standard head. (Fig. 2.)

The mechanism illustrated and described for closing the chuck is very powerful, so that the jaws will firmly hold the stock that is to be operated upon, and by the very simple mechanism shown, this powerful closing and holding mechanism can be easily and quickly adjusted for stock of different diameters. The stock is exactly located in the jaws, and after it has been operated upon it is gripped and swung to one side away from the remainder of the mechanism of the machine, by a simple and sure mechanism.

The invention claimed is:

1. A chuck mechanism for a pointing machine consisting of movable chuck jaws, levers for opening and closing the chuck jaws, cams for causing the levers to close the chuck jaws, a plunger for locating the stock in the chuck jaws, and a cam for causing the plunger to locate the stock in the jaws.

2. A chuck mechanism for a pointing machine having movable chuck jaws, levers mounted upon swinging pivots for opening and closing the chuck jaws, cams for swinging the levers and causing the chuck jaws to close, a plunger for locating the stock in the chuck jaws, and a cam for causing the plunger to locate the stock.

3. A chuck mechanism for a pointing machine consisting of movable chuck jaws, levers connected with the chuck jaws, adjustable backing blocks, links hinging the levers to the backing blocks, and cams for swinging the levers and causing them to close the chuck jaws toward each other.

4. A chuck mechanism for a pointing machine consisting of movable chuck jaws, backing blocks, means for clamping the backing blocks, means for adjusting the backing blocks, levers connected with the chuck jaws, links connecting the levers with the backing blocks, and cams for swinging the levers and links and causing them to close the chuck jaws.

5. A chuck mechanism for a pointing machine consisting of movable chuck jaws, levers for opening and closing the chuck jaws, a spring plunger for locating the stock between the chuck jaws, a spring retracted block carrying said plunger, and a cam for forcing the block and plunger forward.

6. Mechanism for a pointing machine consisting of movable chuck jaws, levers for opening and closing the chuck jaws, means for locating the stock between the chuck jaws, and an oscillatory head carrying a yielding finger for taking the stock from the chuck jaws and delivering it at one side.

7. Mechanism for a pointing machine consisting of movable chuck jaws, levers hinged to the chuck jaws, adjustable backing blocks, and links pivoting the levers to the backing blocks.

8. Mechanism for a pointing machine, consisting of chuck jaws and means for opening and closing the jaws, an oscillatory head, a yielding finger carried by the head, a pinion and rack for oscillating the head and finger, and levers, link and cam for oscillating the rack.

9. Mechanism for a pointing machine consisting of movable chuck jaws, levers mounted on swinging pivots and connected with the chuck jaws, cams for swinging the levers, yielding mechanism for locating the stock between the chuck jaws, an oscillatory head bearing a gripping finger for removing the stock from the chuck jaws, and means for oscillating the head.

10. A chuck mechanism for a pointing machine having chuck members, levers pivotally connected with the chuck members, swinging links pivotally connected with said levers, cams for oscillating said levers, a stock locating plunger, a cam for actuating said plunger, a delivery head carrying a stock grasping finger, and a cam for oscillating said head.

DAVID JULIAN.

Witnesses:
HARRY R. WILLIAMS,
ADOLPH C. KAISER.

Copies of this patent may be obtained for five cents each, by addressing the "Commissioner of Patents, Washington, D. C."